Aug. 10, 1965   E. F. ZABINSKI   3,199,400
INTERFEROMETRIC DEVICE AND METHOD FOR DETERMINING RANGE
Filed Oct. 9, 1961

INVENTOR.
EDWARD F. ZABINSKI
BY
Reynolds & Christensen
ATTORNEYS

United States Patent Office 3,199,400
Patented Aug. 10, 1965

3,199,400
INTERFEROMETRIC DEVICE AND METHOD
FOR DETERMINING RANGE
Edward F. Zabinski, 25419 124th SE., Kent, Wash.
Filed Oct. 9, 1961, Ser. No. 143,928
8 Claims. (Cl. 88—1)

This invention relates to apparatus for determining range or distance from a measurement location to a remote point by optical techniques and more particularly concerns an improved optical ranging system utilizing interferometric techniques. The invention is herein illustratively described by reference to the presently preferred embodiment thereof; however, it will be recognized that certain modifications and changes therein with respect to details may be made without departing from the underlying essentials involved.

Present optical methods of range measurement rely upon a binocular system of triangulation using an effective base line within the instrument which is perpendicular to the line of sight and rely upon mechanical motion in order to make individual measurements. This mechanical motion is introduced by a human operator manipulating the instrument. Because of the requirement of a base line perpendicular to the line of sight, compactness of the instrument in a transverse direction is difficult to achieve. Because of the requirement for mechanical motion of optical components accuracy is difficult to achieve except at great cost. Furthermore, because of the requirement of mechanical motion based on manual observation and manipulation, automation of measurement is not possible or practicable.

In general, the present invention is directed to provision of an optical type ranging device without the above-mentioned and related limitations of previous optical instruments. In this case, ranging is accomplished by conversion of optical information directly into electrical inforation on a basis suitable for accurate and instantaneous measurement of range. Moreover, the measurement of range to a particular target (i.e., light source) may be made on a continuous basis throughout a wide variation of distances to the target. Provision may also be made in the apparatus to accommodate targets at different ranges so as to achieve highest accuracy at all ranges.

As in other optical ranging or spotting devices, the present ranging instruments lend themselves readily to automatic angle tracking of isolated targets if desired for purposes of automation or ease of control and operation.

A further object of this invention is to provide ranging with existing and readily available components at practicable cost.

Still another object is highly versatile optical ranging technique which will fulfill existing needs in various fields. Examples of useful applications for the invention include ranging from an airplane to the touchdown point on a landing field, automatic fusing of high explosive projectiles, airborne anti-collision system ranging, missile guidance, station-keeping in aircraft formation flights, and various others.

As herein disclosed the invention comprises an optical system for imaging the target whose range is to be measured, an optical means for splitting the target image so formed in order to create an interference pattern from the image, suitable photoelectric means receptive to the interference pattern and operable to convert the fringe lines thereof into electrical signals, and means to measure characteristics of the electrical signals as a measure of range. In the preferred case the fringe lines are converted into electrical impulses occurring in time sequence on a predetermined time base and the range measurement means cooperating therewith measures the time relationship of successive impulses as a measure of target range.

This measurement of time relationship may be in terms of recurrence frequency of the electrical impulses, as in a fringe line scanning system, or may be in terms of time interval measurement, i.e., between successive impulses directly. Alternatively it may be accomplished by measuring number of fringe lines or physical spacing between successive fringe lines if desired.

In the illustrated system the light interference or fringe pattern is projeced onto a receiving plane comprising the screen of a cathode ray tube, the electron beam of which is periodically scanned across the face of the tube in a path transverse to the fringe lines, with means responding electrically to the crossing of individual fringe lines by the scanned beam.

These and other features, objects and advantages of the invention will become more fully evident from the following description thereof by reference to the accompanying drawings.

Figure 1:
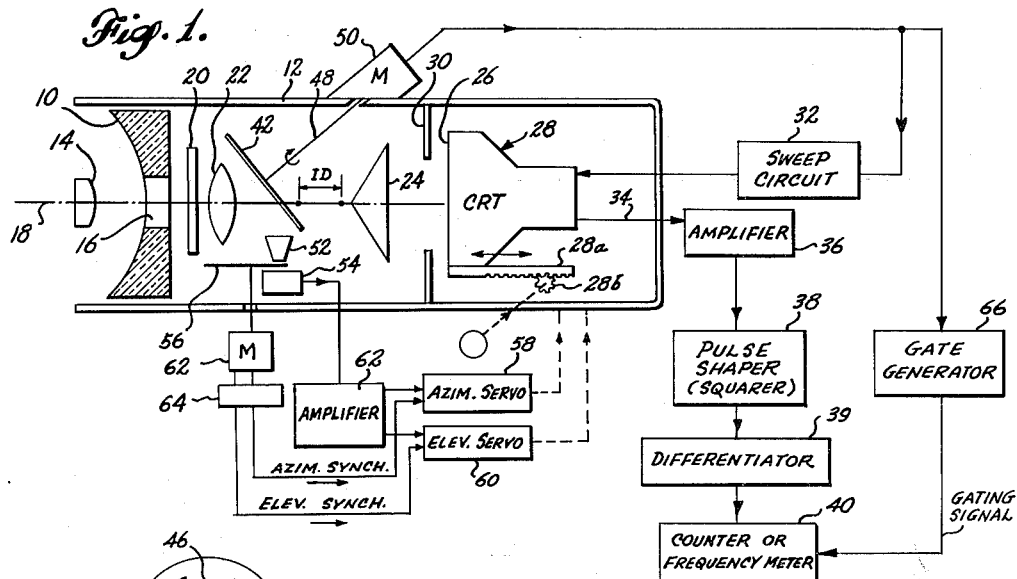
FIGURE 1 is a schematic diagram of a ranging device embodying the invention.

As is well known in optical physics, a light image may be split by a Fresnel biprism or equivalent means in order to produce an interference effect from interaction of the resultant radiation wave fronts. If the light is fairly monochromatic an interference pattern will be obtained which is manifested as fringe lines on a screen or other receiving means disposed in the path of the light.

In utilizing this basic knowledge, the present invention provides in the illustrated case a Cassegrainian type telescopic optical system including a first surface parabolic mirror 10 directed toward a remote light source whose range is to be measured by the appropriate directional positioning of the instrument housing 12. A first surface hyperbolic mirror 14 receives the light collected by the mirror 10 and directs it through a central aperture 16 in the mirror 10 along an optical axis 18. A filter 20 placed along the optical axis filters out extraneous wavelengths, so that the resultant light which then passes through the collector lens 22 is fairly monochromatic. Typically and for reasons of target selectively from amongst background light signals, the filter 20 is selective to a frequency in the infrared region. The lens 22 images the light at a point on the optical axis within the range of distances designated ID in the figure. The light thus imaged along the optical axis 18 passes through the image splitter 24 which in this instance comprises a Fresnel biprism. The emerging wavefronts of light propagating through the biprism experience interference interaction due to phase differences in the receiving plane 26, which is formed in this instance by the screen of a cathode ray tube 28 disposed on the optical axis 18 transversely to the extent of such axis.

A mask 30, which may be located either between the biprism 24 and the imaging tube 28 or may be located on the face of the imaging tube, is employed to eliminate the diffraction fringes which occur with the interference fringes. Also, the mask limits the number of interference fringes permitted to occur on the tube screen. Because the separation distance between the fringe lines caused by diffraction is different from that caused by interference, and since the apparatus is critically dependent upon fringe separation for range measurement, only the interference fringes are used.

If desired, the distance of separation between the biprism 24 and the imaging tube 28 can be made variable, as by mounting the tube itself on a gear rack 28a operable by a drive pinion 28b. This allows use of the same equipment for a number of different applications, i.e., different range intervals to be measured.

Figure 2:
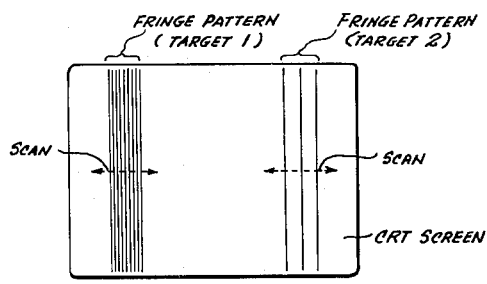
FIGURE 2 is a diagram showing the interference fringe lines which are impressed on the screen of a cathode ray tube in the embodiment of FIGURE 1, with a Fresnel biprism as the image splitter.
Figure 3:
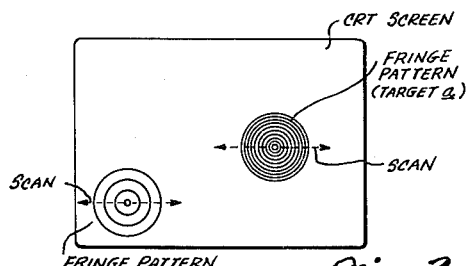
FIGURE 3 is a similar diagram showing the image lines with an Axicon as the image splitter.

FIGURE 2 illustrates the presence of interference fringe lines on a cathode ray tube screen with two targets at respectively different ranges within the field of the instrument. The closely spaced fringe lines of target 1 indicate a distant target, whereas the more widely spaced fringe lines of target 2 indicate a target at closer range.

As will be evident, the location of the target image on the optical axis within the interval ID is dependent upon the range to the light source or target. In turn, the number of fringes per unit distance, measured transversely to the length of the individual fringes, is a function of the image distance from the biprism 24. Therefore, with the optical system fixed, the number of fringes produced per unit distance on the tube screen is a direct function of range to the target. Of course, it makes no difference whether the fringe interval is measured or the total number of fringes across a given width of the screen is measured in order to gain a measure of range.

The invention usefully applies the interference effect just described to measure range by converting the fringes into electrical signals and by sensing the number of these signals in each scan, their recurrence frequency, or the time interval occurring between successive signals in the event of a scan of fringe lines on a predetermined time base. Thus, a sweep circuit 32 connected to the electron beam deflection apparatus of the cathode ray tube 28 recurringly sweeps the electron beam across the face of the tube transversely to the extent of individual fringe lines produced by a target or light source. In so doing, the electron beam releases electrons from the photosensitive screen of the cathode ray tube, and the resultant change of potential of the screen is transmitted by a conductor 34 to the input of an amplifier 36, all in known manner. The amplifier output, representing a succession of approximately sinusoidal impulses, preferably is passed through a pulse shaper 38 which clips the peaks from the impulses and produces a series of substantially square waves with each sweep of the electron beam. A differentiator 39 sharpens the leading edges of the individual square waves to produce sharp impulses which are applied to a measuring device 40, such as a counter, a frequency meter, or an interval meter. A measure of range is thus obtained by converting the fringe lines impressed optically on a photoelectric means into electrical impulses for measurement purposes.

Figure 1A:
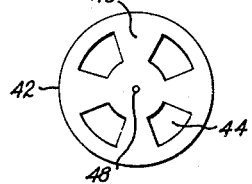

In some cases it is desirable to maintain the optical axis 18 directed toward the remote object by automatic means. This is accomplished as shown in FIGURE 1, by a time sharing arrangement wherein automatic angle tracking apparatus receives light from the target at closely spaced time intervals which alternate with time intervals during which such light is permitted to pass through the Fresnel biprism 24. In the illustration, a disk-shaped mirror 42 (FIGURE 1A) having alternate apertures 44 and reflecting areas 46 rotates on an inclined axis 48 at a selected speed determined by the drive motor 50 mounted on the instrument casing 12. When the apertures 44 are in registry with the optical axis 18, light passes from the lens 22 to the biprism 24 for operating the range measuring apparatus. However, when an intervening reflector surface 46 is interposed in the path of light, the light is reflected downwardly through a suitable optical system such as the illustrated cone channel condenser 52 which transmits the light to a detector cell 54. A tracking reticle 56 is interposed between the condenser 52 and the cell 54 in order to develop signals for operating the azimuth servo 58 and elevation servo 60. A motor 62 rotates the reticle plate 56 at constant speed and is coordinated with a tracking gate apparatus 64 by which azimuth and elevation synchronization gates are fed to the azimuth and elevation servos. Output from the detector cell 54 is fed through an amplifier 62 to the azimuth and elevation servos such that error signals both in azimuth and elevation, sensed by the cooperative action of the rotated reticle 56, the synchronization source 64 and the pickup 54, apply corrective movements to the casing 12 so as to maintain the selected target substantially on the optical axis 18. Angle tracking apparatus of this character is well known in the art and constitutes no necessary part of this invention.

When a time sharing device is used for developing range measurement information from the same light system as that developing angle tracking information, it is, of course, desirable to employ coordinating means to insure that only the selected information signals affect the function being performed. In this case, for example, a control signal related to mechanical positioning of the disk 42 is derived for operating the sweep circuit 32 synchronously with inception of the respective periods in which light from the collector lens 22 reaches the biprism 24 through one of the apertures 44 in the mirror disk 42. Moreover, the same synchronizing signal, shown for schematic purposes as emanating from the unit representing the motor 50, is also applied to a gate generator 66 for rendering the measuring apparatus 40 operative only during those periods. The gate generator 66 may comprise any suitable square-wave generating circuit such as a monostable multivibrator or equivalent.

Where there is more than one target in the field of view and the targets are separated by a finite angular distance (i.e., in a plane perpendicular to the apex of the biprism 24) the respective fringe patterns for the targets will be separated on the cathode ray tube screen as shown in FIGURE 2. It is, of course, possible by appropriate gating techniques to measure the fringe lines for each of the respective targets in this case, such that while the sweep is traversing one set of fringe lines, the indicator apparatus will be presenting a measure of range to that particular target, whereas when the sweep traverses the other set of fringe lines other indicator apparatus will be energized or the same indicator apparatus will be switched over to indicate range to the other target. Of course, as the angular separation between the targets becomes progressively smaller, the fringe patterns thereof will approach each other and eventually will merge and preclude reliable measurements.

If the plane in which the targets are angularly separated as in the discussion immediately above is the plane perpendicular to the apex line of the biprism, resolution of targets is possible. However, if it is a plane perpendicular to that plane then resolution between targets is no longer possible with a biprism as the image splitter 24. In that event a different type of image splitter may be used in order to produce separated fringe patterns on the cathode ray tube screen or other receiving-plane photoelectric signal generating device. For example, if the image splitter 24 shown in FIGURE 1 is an Axicon (i.e., a figure of revolution symmetrical about the optical axis 18) the resultant fringe pattern of a target will be a group of concentric circles the respective radii of which vary in accordance with an arithmetic progression. Thus, if there are two targets in the field of view, two sets of concentric circles will appear and these will be separated in both azimuth and elevation as the targets are similarly separated in azimuth and elevation. Only if the targets are on or near the same line so as to cause superpositioning of the respective fringe patterns will there be ambiguity in the results. An Axicon or equivalent image splitter which confines the fringe lines in two planes on the receiving surface thus permits discernment of targets separated either in elevation or in azimuth or both. In the detection of these fringe lines by electrical means it is necessary to accurate ranging that the electron beam sweep pass through the center of the fringe line circles. This control of sweep path may not always be practical and in some cases it may be necessary to shift the sweep path progressively in a direction transversely of itself so as to scan the fringe pattern of each target and note the point at which fringe line impulse frequency is maximum during the scan. When such maximum point is noted the frequency of the resultant electrical impulses will represent range to the target.

Another advantage of using an Axicon or equivalent image splitter lies in the attendant ability to utilize or observe the fringe patterns as presented on the receiving device for the purpose not only of determining range to the target but also of determining azimuth and elevation angles thereto. In order to determine when frequency becomes a maximum and to determine its value at that point an electrical value representing frequency is stored with each sweep and is compared with the frequency of the next preceding sweep in order to detect the maximum point. Thereupon through a memory function the maximum frequency is recalled by the apparatus and is representative of target range. Moreover, the position of the electron beam sweep at the point of maximum frequency represents the angular deviation of the target from the optical axis. Such information may usefully be applied to control of servomechanisms using known apparatus techniques in order to track the target.

Figure 4:
FIGURE 4 is a similar view with the image lines formed by two orthogonally related biprisms as the image splitter.

In FIGURE 4 there is shown the effect of employing two Fresnel biprisms, one oriented with its apex line in the elevation plane and the other oriented with its apex line in the azimuth plane. Either of the fringe patterns thus produced may be used as a source of range information in accordance with the invention and both may be used as a means to track in elevation and in azimuth or to measure azimuth and elevation angle.

Still other image splitters may be employed in the apparatus, including but not necessarily limited to Lloyd's mirrors, the Billet split lens arrangement, and others.

In one application of the invention this system may be used effectively to supplement existing blind landing and blind approach systems for aircraft. By mounting at the end of a runway a monochromatic light source producing a glide-path-defining beam the pilot or navigator using the present ranging device can readily determine optically distance-to-go to the point of touchdown. For example, an intense beam can readily be produced in the infrared region so that it will not blind the pilot and yet will readily be usable by the present optical ranging apparatus.

Figure 5:
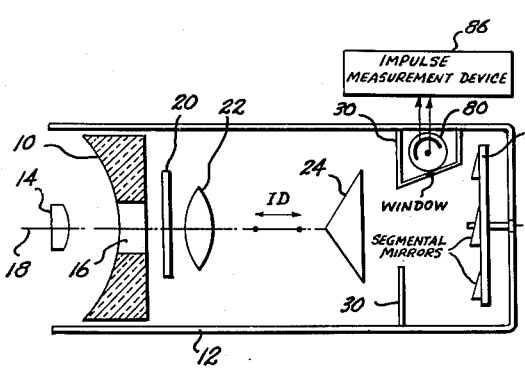
FIGURE 5 is a schematic diagram of a modified system.
Figure 5:

Instead of utilizing a photoelectric type screen, as such, as the means to convert the fringe lines into electrical impulses, a different optical device may be used of a photoelectric nature, such as a rotating or moving mirror system and a photoelectric cell having a receiving aperture across which the fringe lines are swept in successive order by mirror rotation. With each fringe line swept across the photoelectric cell aperture an electrical impulse is generated. These impulses may be measured as to time interval, as to total number, or as to recurrence rate or frequency in order to derive a measure of range as in the preceding embodiment. Such a system is shown in FIGURE 5. The cathode ray tube receiving device used in the preceding embodiment is replaced by a photoelectric cell 80 and a rotated segmented mirror 82 driven by a motor 84. The effect is to scan the interference pattern by moving its lines in succession across the sensitized photocell surface and thereby convert the fringe lines into electrical impulses. These in turn are measured as to number per scan, recurrence frequency or recurrence interval by suitable means 86. Suitable range read-out apparatus may be included in or associated with the device 86.

These and other aspects of the invention will be recognized by those skilled in the art on the basis of the foregoing disclosure of the presently preferred embodiments and practices of the invention.

I claim as my invention:

1. An optical device for measuring range to a discrete source of light energy physically separate from the device, comprising a light collector operable to image the source along an optical path and at a definite path distance from the collector which varies with range of the source, a refractor disposed in such path beyond the image so formed to intercept such light, said refractor having an optical axis aligned with such path and having respective refracting portions on opposite sides of such axis which refract the intercepted light in different directions, thereby to produce a resolvable light interference pattern in a receiving plane beyond said refractor, and a photoelectric detector having sensitized means disposed in said receiving plane and electrical means cooperating therewith to measure the interference interval spacing of said pattern as a measure of source range.

2. An optical device for measuring range to a discrete source of light energy physically separate from the device, comprising means to image the source at a position within the device at a definite path distance from the imaging means which varies with range of the source, means intercepting light propagating beyond the image position, to produce a resolvable light interference pattern therefrom in a receiving plane, and a photoelectric detector means mounted in the receiving plane and operable to measure the interference interval spacing of said pattern as a measure of source range.

3. The optical device defined in claim 2, wherein the means to produce the interference pattern comprises a Fresnel biprism.

4. The optical device defined in claim 2, wherein the means to produce the interference pattern comprises an Axicon producing rings of interference, and the means mounted in the receiving plane comprises means to indicate relative direction of a plurality of separate light sources.

5. An optical ranging device comprising an optical system for imaging a remote target physically separate from the device and whose range is to be measured, the image being formed in said device at a definite path distance from the imaging means which varies with range of the source, optical means for splitting the image so formed to create a resolvable interference pattern therefrom, photoelectric means receptive to the interference pattern projected thereon and operable to convert the fringe lines of the interference pattern into associated electrical impulses occurring in time sequence on a predetermined time base, and means responsive to the impulses for measuring the time relationship of successive pulses as a measure of target range.

6. An optical ranging device comprising an optical system for imaging a remote target physically separate from the device and whose range is to be measured, the image being formed in said device at a definite path distance from the imaging means which varies with range of the source, optical means for splitting the image so formed to create a resolvable interference pattern therefrom, photoelectric means receptive to the interference pattern projected thereon and operable to convert the fringe lines of the interference pattern into associated electrical impulses, and means responsive to the impulses for measuring a characteristic of such impulses as a measure of target range.

7. An optical ranging device comprising an optical system for imaging a remote target physically separate from the device and whose range is to be measured, the image being formed in said device at a definite path distance from the imaging means which varies with range of the source, optical means for splitting the image so formed to create a resolvable interference pattern therefrom, photoelectric means receptive to the interference pattern projected thereon and operable to convert the fringe lines of the interference pattern into associated electrical impulses, and means to count such impulses as a measure of target range.

8. The method of determining range to a separate, remote optical target, comprising optically imaging the target at a location the distance of which from a predetermined point varies with range of the target, and splitting such image in order thereby to form a resolvable interference fringe pattern, converting the interference pattern fringes into electrical signals, and measuring a characteristic of such signals as a measure of target range.

References Cited by the Examiner
UNITED STATES PATENTS 2,580,498   1/52   Ackerlind.

JEWELL H. PEDERSEN, *Primary Examiner*.